(12) United States Patent
Krylov

(10) Patent No.: US 10,600,086 B2
(45) Date of Patent: Mar. 24, 2020

(54) SYSTEM AND METHOD FOR PROJECTING AND DISPLAYING IMAGES

(71) Applicant: Alexander Krylov, Los Angeles, CA (US)

(72) Inventor: Alexander Krylov, Los Angeles, CA (US)

(73) Assignee: ADWAY INTERNATIONAL, INC., Los Angeles, CA (US)

( * ) Notice: Subject to any disclaimer, the term of this patent is extended or adjusted under 35 U.S.C. 154(b) by 0 days.

(21) Appl. No.: 15/456,417

(22) Filed: Mar. 10, 2017

(65) Prior Publication Data

US 2019/0147492 A1    May 16, 2019

Related U.S. Application Data

(60) Provisional application No. 62/307,493, filed on Mar. 13, 2016.

(51) Int. Cl.

| | |
|---|---|
| *G03B 21/14* | (2006.01) |
| *G06Q 30/02* | (2012.01) |
| *H04W 4/021* | (2018.01) |
| *H04M 1/725* | (2006.01) |
| *H04W 4/23* | (2018.01) |
| *H04M 1/02* | (2006.01) |
| *G06F 16/29* | (2019.01) |
| *G03B 29/00* | (2006.01) |
| *G03B 21/28* | (2006.01) |
| *G09F 21/04* | (2006.01) |
| *G09F 19/18* | (2006.01) |
| *B60R 11/02* | (2006.01) |
| *G06F 16/587* | (2019.01) |
| *B60R 11/00* | (2006.01) |

(52) U.S. Cl.
CPC ...... *G06Q 30/0266* (2013.01); *B60R 11/0229* (2013.01); *G03B 21/28* (2013.01); *G03B 29/00* (2013.01); *G06F 16/29* (2019.01); *G06F 16/587* (2019.01); *G09F 19/18* (2013.01); *G09F 21/048* (2013.01); *H04M 1/0272* (2013.01); *H04M 1/72572* (2013.01); *H04W 4/021* (2013.01); *H04W 4/23* (2018.02); *B60R 2011/004* (2013.01); *B60R 2011/0049* (2013.01)

(58) Field of Classification Search
CPC ........ G03B 21/14; G03B 21/28; G03B 29/00; G06Q 30/0266; H04W 4/23; H04W 4/021; G06F 16/587; G06F 16/29; G09F 19/18; G09F 21/048; H04M 1/0272; H04M 1/72572; B60R 2011/004; B60R 2011/0049; B60R 11/0229
See application file for complete search history.

(56) References Cited

U.S. PATENT DOCUMENTS

| | | | |
|---|---|---|---|
| 6,122,850 A | 9/2000 | Strzeletz | |
| 7,175,321 B1 * | 2/2007 | Lopez | B60Q 1/50 296/21 |

(Continued)

*Primary Examiner* — Cara E Rakowski
*Assistant Examiner* — Magda Cruz
(74) *Attorney, Agent, or Firm* — Fenwick & West LLP

(57) ABSTRACT

The present invention relates to a system and method for selecting and transmitting images, particularly commercial messages and advertisements, to a projecting device mounted on a vehicle for projection and display of the images on the surface of the vehicle.

10 Claims, 7 Drawing Sheets

(56) References Cited

U.S. PATENT DOCUMENTS

| | | | | |
|---|---|---|---|---|
| 8,096,069 | B2* | 1/2012 | Ishikawa | G09F 21/045 |
| | | | | 345/204 |
| 9,178,371 | B2* | 11/2015 | Koelsch | H02J 7/0047 |
| 9,321,395 | B2* | 4/2016 | Ammar | B60R 1/12 |
| 9,827,901 | B1* | 11/2017 | Thompson | B60Q 1/34 |
| 10,160,380 | B1* | 12/2018 | Salter | B60Q 1/32 |
| 2010/0039379 | A1* | 2/2010 | Hildreth | G06F 3/0418 |
| | | | | 345/156 |
| 2011/0273671 | A1* | 11/2011 | Chu | G03B 21/14 |
| | | | | 353/13 |
| 2013/0231828 | A1* | 9/2013 | Seal | G09F 19/18 |
| | | | | 701/36 |
| 2013/0342458 | A1* | 12/2013 | Williams | G09B 5/067 |
| | | | | 345/158 |
| 2014/0188614 | A1 | 7/2014 | Badenhop | |
| 2015/0032328 | A1* | 1/2015 | Healey | B60Q 1/503 |
| | | | | 701/36 |
| 2016/0167648 | A1* | 6/2016 | James | B60Q 1/503 |
| | | | | 701/28 |
| 2017/0200197 | A1* | 7/2017 | Brubaker | G09F 9/35 |
| 2018/0004473 | A1* | 1/2018 | Amaru | B60K 37/00 |

\* cited by examiner

SYSTEM AND METHOD FOR PROJECTING AND DISPLAYING IMAGES

RELATED APPLICATIONS

This application claims the benefit of priority under 35 U.S.C. 119(e) of Provisional Application No. 62/307,493, filed Mar. 13, 2016. This provisional application is incorporated by reference herein in its entirety.

BACKGROUND OF THE INVENTION

It has become a common practice to display advertising material on vehicles. Many commercial transport vehicles, for example, taxi-cabs and buses, lease space on the vehicle to mount and display commercial advertisements for advertising clients. Further, vehicles specifically purposed for the display of advertising material are common in the art. U.S. Pat. No. 6,122,850 (Strzeletz), for example, discloses a mobile billboard advertising system whereby a plurality of advertisements can be displayed in connection with a motor vehicle by means of rotatable display panels mounted on the vehicle. Vehicle advertising of this type has limitations in that the messages typically are fixed and do not allow for changes to the advertising messages while "in the field." Moreover, the system of displaying advertisements on large panels mounted on the vehicle is appropriate only for a vehicle specially built for that purpose. Passenger vehicles, which are far more numerous and therefore represent tremendous potential for mobile advertising, are not a practical solution given the current state of mobile advertising display.

Mobile technology has emerged as providing a means for advertisers to target customers with electronic devices (for example smartphones or tablets,) with advertisements relevant to the user's established preferences and geographic location. For example, U.S. Patent Application 2014/0188614 (Badenhop) discloses a messaging system app that displays commercial messages on a user's electronic device when that user has exhibited, through use of his or her electronic device, a preference for the advertiser's goods and services and when the user is located near advertiser's location. This technology is limited however to targeting the consumer preferences of the owner of the mobile device.

What is desired therefore, and not provided in the prior art, is a method and system for advertisers to efficiently target and have displayed advertisements and other messages to a large number of people located in a region where such advertisements would have a positive effect on such people and which also utilizes a changeable, mobile display of those messages on a potentially large number of mobile platforms in the form of passenger vehicles and the like when such vehicles are within a particular desired geographic and demographic location.

What is also desired is a system and method whereby users of passenger vehicles can utilize the display space inherent on their vehicles to display advertisements and other messages for which the users can derive a financial or other benefit.

SUMMARY OF THE INVENTION

According to the present invention there is provided a novel system and method for displaying images, particularly messages and commercial advertisements and the like, upon the surface of a vehicle. The method and system utilizes and comprises an application for a mobile device wherein a user, a vehicle owner, registers the vehicle, ideally by means of downloading the application to the user's mobile device and providing certain registration information to the application's database. The user is also provided with a display device, e.g, a projector, which the user mounts on the side view mirror of the vehicle. Pursuant to the user's registration with the database, the user may also provide certain parameters or limitations with respect to the type and nature of advertising that the user is willing to display. Registration of the user's vehicle in this manner and the user's subsequent activation and utilization of the display device while driving the vehicle serve to provide the database with location information, by means of for example, GPS tracking technology, time information, and other information of the user's vehicle to the servers of the system.

An advertiser also registers with the database, ideally through an internet-based website, and pursuant to that registration, deposits with the database, via network upload through the website, an image or series of images constituting the advertiser's advertising campaign. The advertiser also provides information related to the execution of the advertising campaign, namely, a set of preferences regarding how long, where, and when the advertising campaign is to be displayed and how much the advertiser has authorized to be charged for such a campaign.

Thereafter, the system and method of the invention provides for the coordination of the location and other parameters of an online user with an appropriate advertising campaign. The images comprising the appropriate advertising campaign are then transmitted via the network connection to the display device. The user's mobile device is also in electronic communication with the display device mounted on the user's vehicle and configured to project images communicated to it for display of the images on the side surface of the user's vehicle or other suitable surface of the user's vehicle. Through engagement with the application, the user can accept an appropriate advertising campaign at which time the images of that campaign are projected and displayed onto the surface of the user's vehicle. The advertiser is charged for any such display pursuant to the terms of its registration agreement. The user, likewise, is compensated for such display pursuant to the terms of the user's registration agreement.

The projection device utilized by the user to project the images of the advertising campaign onto the user's vehicle is configured to attach securely and discretely to the outside of the user's vehicle, ideally by attachment to the vehicle's side view mirror and via a single strap type of fastener that wraps around the stalk of the side view mirror thus providing an upper securing means and lower securing means to the side view mirror with one fastener. The desire for such attachment is for both aesthetic reasons and practical reasons, that is, to permit the display of images onto the generally expansive surface of the side of a vehicle. However, projection of images pursuant to this arrangement in a manner that provides a distortion free image is not heretofore found in the art. Accordingly, the invention includes a projection device comprising a casement configured to attach to the body of a side view mirror of a vehicle, which configuration is customizable to the type of vehicle. A projection system is enclosed within the casement and comprises an aspheric mirror and lens arrangement coupled with short-throw projecting technology found in the art. This arrangement provides for the proper pre-distortion of the image for projecting at the oblique angle presented by the system and method of the invention in a manner that results in a distortion-free image suitable for proper viewing.

These features and advantages of the present invention will become more fully apparent from the following description and appended claims.

BRIEF DESCRIPTION OF THE DRAWINGS

The invention will be more readily understood with reference to the accompanying drawings, wherein like reference numerals refer to like components throughout the several views.

DETAILED DESCRIPTION OF THE INVENTION

Figure 1:
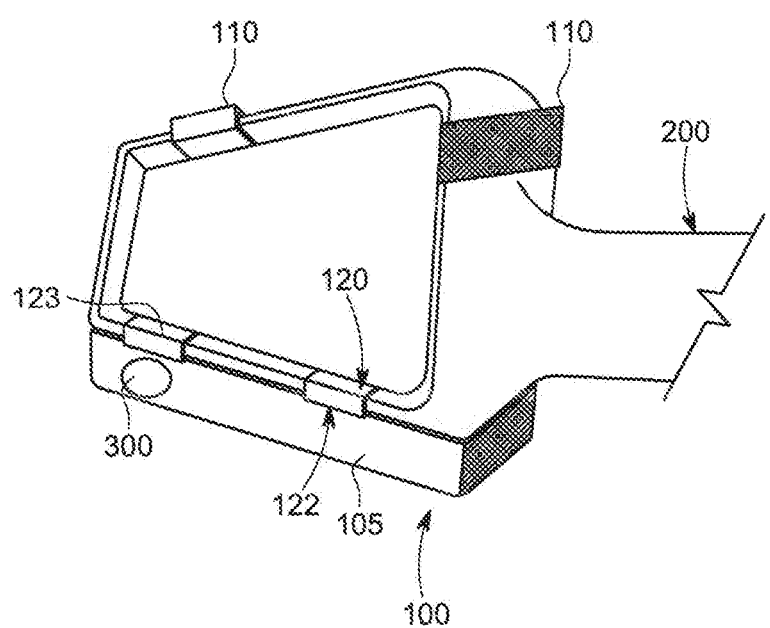
FIG. 1 is a perspective view of the projecting device of the invention.

For the purposes of promoting an understanding of the principles of the invention, reference will now be made to the exemplary embodiments illustrated in the drawings, and specific language will be used to describe the same. It will nevertheless be understood that no limitation of the scope of the invention is thereby intended.

FIG. 1 shows a perspective view of the projecting device (100) of the invention. The projecting device (100) is shown mounted to a side view mirror (200) of a vehicle. The projecting device will comprise a housing (105) which in a preferred embodiment, will be disposed along the bottom of the side view mirror (200) and configured to follow the general shape and outline of the bottom of side view mirror (200). Attachment of the projecting device is accomplished by means of at least one upper mount (110) and at least one lower mount (120). As scene in FIG. 2, in one embodiment, the at least one upper mount (110) is configured to extend from a proximal end (111) located at the back of the housing (105) around the back of the side view mirror (200) to a distal end (112) at the top of the side view mirror (200).

Figure 2:
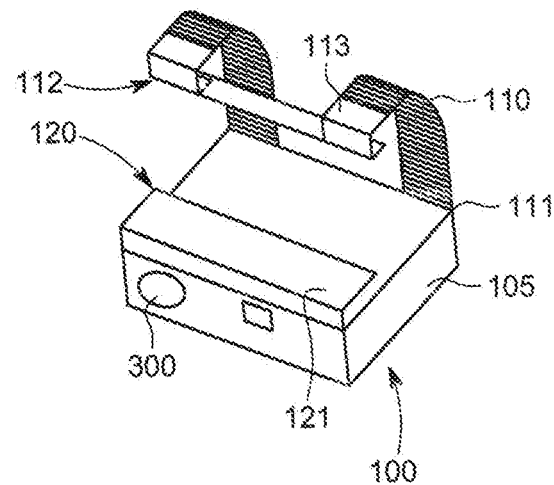
FIG. 2 is a perspective view of another embodiment of the projecting device of the invention.

The distal end (112) of the lower mount will preferably be configured to comprise an attachment means (113) for securing the mount to the top of the housing of the side view mirror (200). The at least one upper mount (110) may be continuous with the housing (105) and thus formed of a rigid plastic or, as shown in FIGS. 1 and 2, be formed of a suitable material, for example, a Velcro strap or elastic material, and be secured to the housing (105) by a suitable attachment means. It is understood that this method of attachment can be accomplished through the means of a single strap or elastic material that wraps around the side view mirror (200) thus comprising both the upper mount (110) and lower mount (120).

The at least one lower mount (120), in an embodiment shown in FIG. 2, can be continuous with and formed from the housing (105) and be configured to attach, via a hooked protrusion (121) to the bottom of the housing of the side view mirror (105). Alternatively, as shown in FIG. 1, the lower mount (120) may be formed and configured in a manner similar to the upper mount (110) and will comprise at least one attachment means (122) secured at a proximal end to the front of the housing (105) and a distal end configured to comprise an attachment means (123) for securing the mount to the bottom of the housing of the side view mirror (105).

Figure 3:
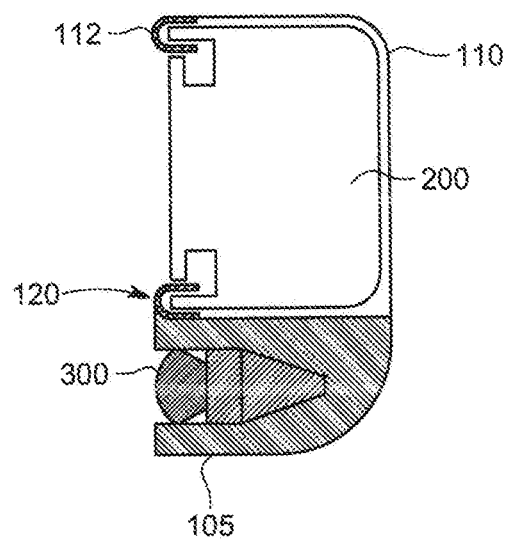
FIG. 3 is a cutaway view of the projecting device of the invention.
Figure 4:
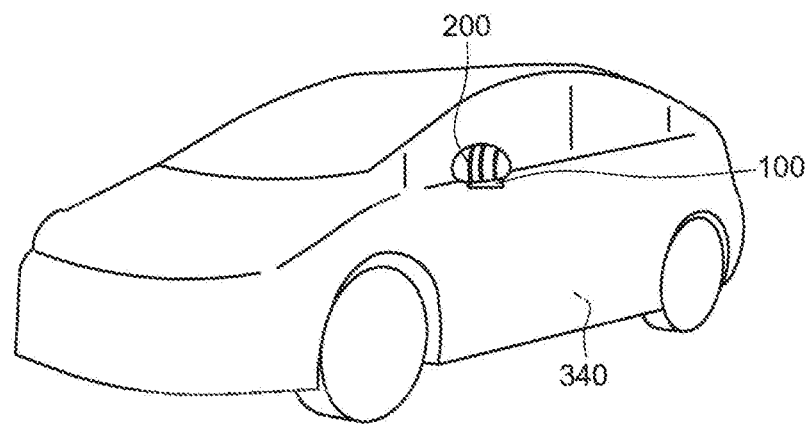
FIG. 4 is a perspective view of a projecting device of the invention shown mounted on a vehicle and projecting an image on the vehicle.
Figure 5:
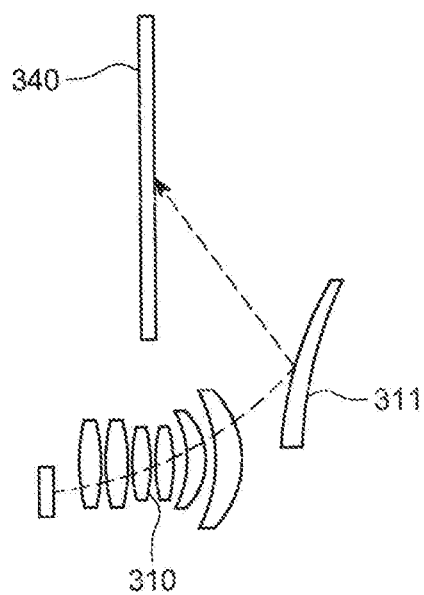
FIG. 5 is a cutaway, exploded view showing details of the projecting device of the invention.

As shown in FIG. 3, a projector (300) is contained within the housing (105) of the projection device (100) and, as seen in FIG. 4, will be configured to provide a projection of an image (340) from the projector (300) to the side of the vehicle, preferably projecting an image (340) onto an area of the vehicle along the side doors. To accomplish this image projection in a manner that will result in a non-distorted image, the projector (300) will be of the "ultra-short throw/high offset" variety as typically found in the art. As such, and as shown in FIG. 5, the projector will comprise a series of lenses (310) configured with an aspheric mirror (311) positioned in front of the series of lenses (310). The aspheric mirror (311) is configured to allow for pre-distortion of the image projected through the lenses (310) at an oblique angle.

The projector (300) will further comprise a projector control unit (340), which will comprise a processor (341) for communicating between the projection device and a central command unit (See FIG. 9 below), an interface for power delivery which preferably will be of a USB-C variety, which is known in the art, and a memory card for storage of images and related information regarding the display of such images, including, for example, the display time, display duration and image sizing.

The projector (300) will further comprise an illumination system of those known in the art and a means for integration of the illumination system. A power supply cable of those typically known in the art will be provided and will be routed to a Command Unit, preferably situated inside the user's vehicle (See FIG. 9, below). As shown in FIG. 4, the resulting image (340) as it appears on the side of the vehicle will be distortion free or otherwise suitable for viewing. In a preferred embodiment, the resulting image (340) will have dimensions of approximately 30" by 80" in a horizontal orientation.

The components of the projection system will preferably be optimized for low power consumption while ideally maintaining 1200 lumen projection. An appropriate cooling system, preferably in the form of a low power fan, will ideally be included. Further, the manufacture of the projection device can be accomplished using methods known in the art. A suitable material for the housing (105) of the projection device (100) would be hard plastic or any other suitable lightweight material such as carbon fiber or fiberglass which will ideally provide an IP65 rating for dust, moisture, shock intrusion protection. In a preferred method, utilizing 3D printing technology would provide an efficient means to manufacture the housing (105) of the projection device (100) as such a method would allow for the creation of a housing (105) that simulates the shape of the particular vehicle's side view mirror (200). However, other methods may be used to properly configure the projection device such that it can be reasonably secured to the side view mirror (200), or other suitable location on a user's vehicle.

As set forth above, the system and method of the invention involves the coordination and involvement of two elements. Specifically, an Advertiser, a person or company who wishes to display an advertisement, message or image onto the side of a vehicle, and a User, a person with a vehicle who desires to provide the services of his or her vehicle for projecting and displaying the advertiser's images.

While the Advertiser and User may be two different entities, it is understood that it is not necessary. The system and method described herein can include an embodiment wherein the Advertiser and the User are one and the same. For example, a User may be a small business owner who desires to project its own advertising campaign on to its own vehicle. Similarly, a User may wish to display personal messages onto the side of his or her vehicle as a novelty or in the form of a public display of support for a local sports team or school. In such examples, the Advertiser/User would simply configure the parameters of its campaign such that the desired messages are displayed on the Advertiser/User's vehicle.

Figure 6:
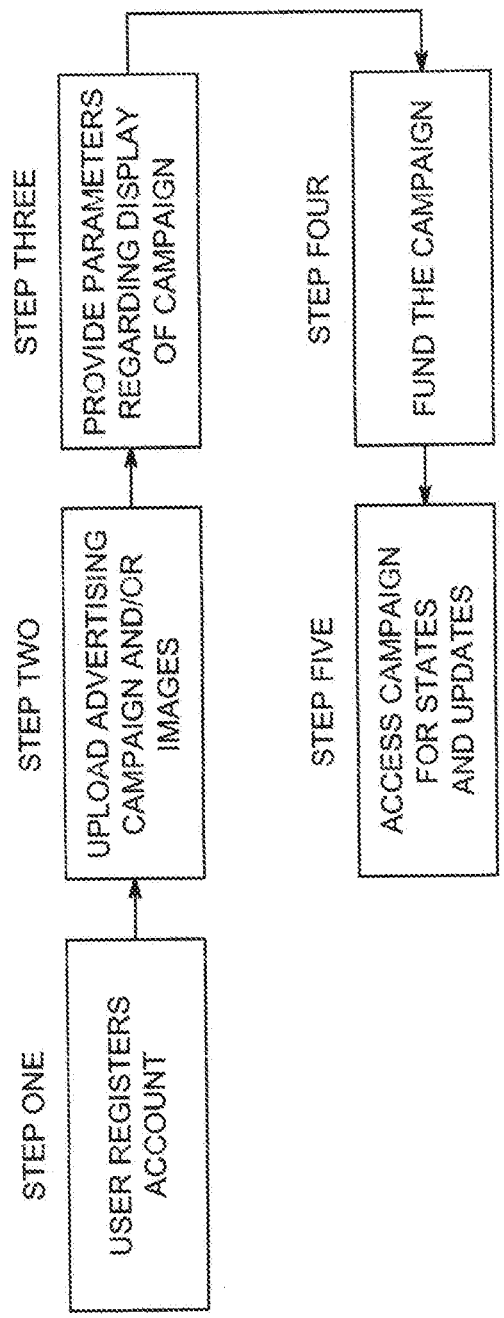
FIG. 6 is a Flow Diagram of the steps taken by an advertiser seeking to use the subject invention.

FIG. 6 is a flow diagram showing the steps involved for an advertiser to display a message, image, or advertisement, according to the system and method of the invention. Specifically, an advertiser wishing to display images or other messages on a user's vehicle registers an account via an online computer network (Step 1), Upon registration, the advertiser would upload an advertising campaign to a network server (Step 2). This advertising campaign could be an image, a series of images, moving images, or a simple message. As shown in (Step 3), the advertiser then provides parameters related to the specific advertising campaign uploaded. Specifically, these parameters would provide information regarding the time frame during which the advertiser wishes to have the images displaced, the geographic location(s) the advertiser wishes the imaged be displayed, and the amount of time the advertiser wishes the advertising campaign to be displayed. In (Step 4), the advertiser deposits funds or otherwise provides payment information so that payment can be made to fund the requested advertising campaign. It is understood that the same advertiser can create more than one campaign utilizing different images and/or different parameters. Each campaign created by an advertiser is assigned identifying information accessible to the advertiser. As seen in (Step 5), the advertiser can log on to the advertiser's registered account and track or otherwise view the implementation of the advertising campaign as it occurs.

Figure 7:
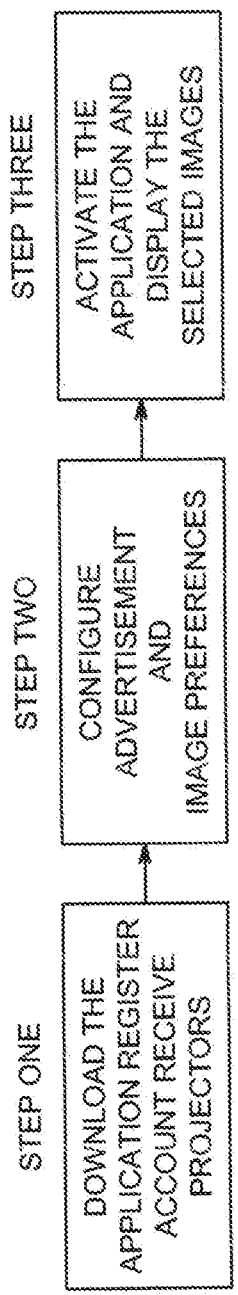
FIG. 7 is a Flow Diagram of the steps taken by a user seeking to display images by means of the subject invention.
Figure 8:
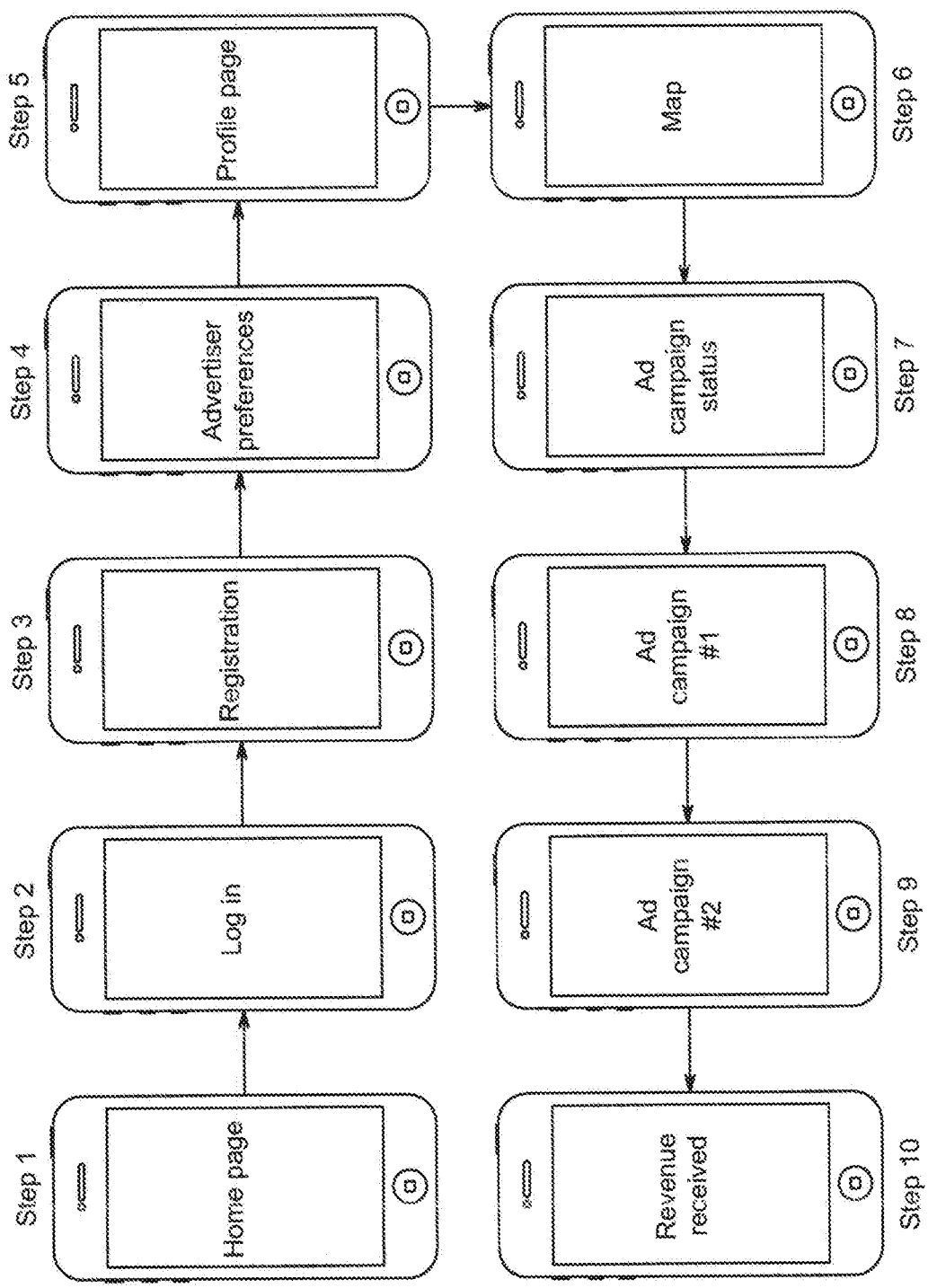
FIG. 8 is a Block Diagram of a mobile device running the application of the invention.

FIG. 7 shows the steps related to a user projecting an advertising campaign on the side of the user's car. In (Step 1), the user downloads an application to the user's mobile device and registers with the application. Pursuant to this registration, the user identifies the vehicle to be used for advertising display. This information will be used to select and provide to the user one or two projection devices suitable for fitment to the vehicle. Once the user receives and mounts the projection device on the vehicle and links the projection device to the user's mobile device inside the vehicle, the user configures preferences with regard to the type of advertisement the user will accept (Step 2). Pursuant to this step, the User may also provide additional information pertinent to the acceptance of an advertising campaign and/or the coordination of an advertising campaign with a suitable user. For example, the number of campaigns desired by the user (if the vehicle is equipped with two projection devices), and the subject matter permitted, not permitted or desired by the User. In (Step 3), the user activates the application. Upon activation of the application, the user will be provided information with regard to suggested advertising campaigns that are consistent with the parameters selected by the user. For example, in an embodiment of the invention, the information provided to the user may include the identity of the advertiser and/or the subject matter of the advertising campaign, the geographic area for which the advertising campaign will be displayed, and the amount of revenue to be paid to the user for displaying the advertising campaign. The user can then opt to accept the advertising campaign or decline it. If accepted, the images associated with the advertising campaign are transmitted to the User's projection device whereupon the images are projected from the projection device onto the user's vehicle. If the user declines an advertising campaign or if a campaign is otherwise ended, the user is provided with another suggested advertising campaign consistent with the parameters set by the user. An example of an embodiment of the user interface (350) providing this information to the user is illustrated in FIG. 8. For example, as shown in FIG. 8, upon installing the application, the mobile device display would display a home page (1) and then, for a registered user, a log in screen (2). For registering a new user, a registration screen would be displayed by the application (3). Upon logging in, a registered user would be presented with a display wherein he or she could enter and edit their advertisement preferences (4). A profile page would also be displayed (5). When a user indicates to the application that the user wishes to display an advertising campaign, location software or other location technology will access the location of the user's vehicle. It is understood that this location technology is located within the user's projection device(s) which are secured to the user's vehicle and which are in communication with the database. A map screen (6) showing the user's location can then be displayed in the application. A suggested campaign based on the user's preferences and location data will be presented to the user, which will inform the user of the campaign details, including the location where the advertisement will be displayed (8) and (9). Using the application, the user can accept or decline the advertisement campaign (8). The user's current status and other information regarding campaigns displayed can be accessed by the user (7) and 10), showing the user, among other data, the revenue received by the user for displaying the advertisement (10).

The display of the approved advertising campaign is then accomplished by means of transmitting the images comprising the advertising campaign directly to the projection device, which is in communication with the database.

Figure 9:
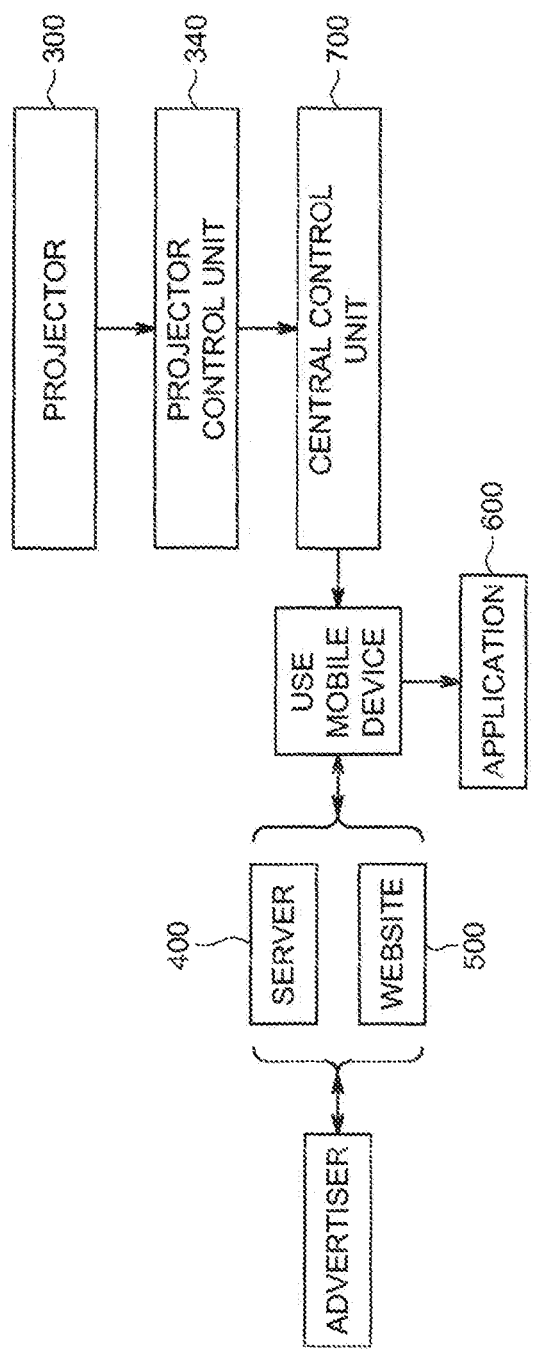
FIG. 9 is a system chart for the present invention.

FIG. 9 is a workflow diagram that shows the steps conducted by the application software to communicate and coordinate an Advertiser's Advertising Campaign with the User's request to display an Advertising Campaign. Specifically, as shown in FIG. 9, the system and method of the invention comprises software to enable communication variously between the database or server (400), a website (500), the application (600), the projector (300) and the central control unit (700). As shown in FIG. 9, information regarding an advertiser's advertising campaign is transmitted to the User's mobile device upon the User's activation of the application and upon the User's geographic location data matching the location parameters set by the advertiser. The User's mobile device is linked via Bluetooth or Near Field Communication with the central control unit (700) situated in the User's vehicle. The central control unit (700) is also in direct communication with the database or server (400) to enable the transmission of images comprising the advertising campaign from the database or server (400) to the projector (300) without the need for the User's mobile device to be turned on or without the need to transmit the images comprising the advertising campaign from the database or server (400) to the User's mobile device. The central control unit (700) provides control commands to the projector control unit (340) via a USB-C cable connection. These commands will include information regarding the display of the advertiser's advertisement campaign, including the images comprising the advertising campaign and other display parameters.

The central command unit (700) will preferably be powered by the user's car battery, which can be accomplished by furnishing the central command unit with a power cable capable of connecting with the car battery, for example a cigarette lighter adaptor cable found in the art. In addition, the central command unit will provide power to the projector control unit. Again, preferably through a USB-C cable connection. The central command unit will also preferably comprise a cooling fan and other power regulation hardware to facilitate proper control and regulation of the communication software. These will be of the variety typically found in the art.

The advertiser is apprised of the status of its advertising campaign by means of the website interface. Upon logging into his or her account, the advertiser can access data from the central command unit situated in a user's vehicle that is utilizing and displaying the advertiser's advertising campaign. The data provided by the central command unit to the advertiser through the website interface will include the location information of the displayed images of the advertising campaigns. This location information will be conveyed in a preferred embodiment to the advertiser by means of a map graphic. Other embodiments can provide location address data or other means as chosen by the advertiser. Further, the data provided to the advertiser will include the amount of the advertiser's allotted budget used and remaining for each campaign. An embodiment of the interface showing such data is illustrated in FIG. 10.

A number of implementations have been described. Nevertheless, it will be understood that various modifications may be made. For example elements of one or more implementations may be combined, deleted, modified, or supplemented to form further implementations. In addition, the logic flows depicted in the drawings do not require the particular order shown, or sequential order, to achieve desirable results. Further, other steps may be provided, and other components may be added, or steps may be eliminated from the described flows, and other components may be added to, or removed from, the described systems. Accordingly, other implementations are within the scope of the following claims.

The invention claimed is:

1. An image display system for projecting images on a vehicle and comprising:
   an internet based registration website providing for transmission by a registrant of data to a server of said website, with said server located at a location remote from the vehicle, and with said data comprising at least one image and a preference of said registrant for a vehicle's geographic location for the display of the image;
   a projector mounted on the vehicle, with the projector in wireless communication with the server, with the projector capable of providing location information of the vehicle to the server and the server capable of transferring images to the projector and the projector configured to display the images onto the side of the vehicle when the location of the vehicle is within the geographic location preference of the registrant; and
   a mobile device application activated by an operator of the vehicle, with said application providing for the operator's management and monitoring of the images.

2. The image display system of claim 1 wherein the location information of said projector is determined by GPS technology.

3. The image display system of claim 1 wherein the image comprises an advertising campaign of registrant.

4. A method for displaying images on a vehicle, the method comprising:
   registering an advertiser client to a network resource via an internet based registration website of the network resource;
   registering a mobile device of a user client to the network resource, wherein a projector is secured to the user client's vehicle and configured to display images onto a side of the vehicle;
   uploading the advertiser client's image to a server of the network resource, with said server located at a location remote from the vehicle and the projector in wireless communication with the server;
   compiling and storing the advertiser client's preference regarding the display of the image to the server, the advertiser client's preference including a preference for a vehicle's geographic location for the display of the image;
   determining, from information provided by the projector, a geographic location of the vehicle;
   selecting the image based on the geographic location of the vehicle and the geographic location preference provided by the advertiser client;
   transmitting the advertiser client's image from the server to the projector; wherein the projector displays the image onto the side of the vehicle.

5. The method of claim 4 wherein the location of the projector is determined by GPS technology.

6. The method of claim 4 further comprising the step of providing image display information to the advertiser client.

7. A projector for mounting on a vehicle comprising:
   a projection housing configured to be secured to a side view mirror of the vehicle; and
   a lens and aspheric mirror arrangement contained within said projection housing and configured to project an image from the projector to the side of said vehicle, the lens and aspheric mirror arrangement consisting of a series of at least two lenses and a convex aspheric mirror.

8. The projector of claim 7 wherein the lens and aspheric mirror arrangement are further configured using ultra short throw projecting technology.

9. The projector of claim 7 wherein the image projected is of a horizontal orientation.

10. The projector of claim 7 wherein the image projected is approximately 30 inches by 80 inches.

* * * * *